US010210683B1

(12) United States Patent
Li et al.

(10) Patent No.: US 10,210,683 B1
(45) Date of Patent: Feb. 19, 2019

(54) PHYSICAL CONDITION BASED INTELLIGENT HOUSE SECURITY SYSTEM

(71) Applicant: INTERNATIONAL BUSINESS MACHINES CORPORATION, Armonk, NY (US)

(72) Inventors: Wei Li, Shanghai (CN); Wanfei Yan, Shanghai (CN); Wei Zhang, Shanghai (CN); You Miao Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/701,582

(22) Filed: Sep. 12, 2017

(51) Int. Cl.
*G07C 9/00* (2006.01)
*G08B 13/24* (2006.01)
*G06K 19/14* (2006.01)

(52) U.S. Cl.
CPC ........ *G07C 9/00111* (2013.01); *G06K 19/145* (2013.01); *G08B 13/2491* (2013.01)

(58) Field of Classification Search
CPC .............. G07C 9/00111; G06K 19/145; G08B 13/2491; G05B 2219/2642; H04L 12/282; H04L 12/2829; G06F 3/011; G06F 3/012; A61B 5/024; A61B 5/11; A61B 5/4809
USPC .......... 340/5.61, 5.82, 506, 541, 542, 545.8, 340/545.9; 713/186, 202
See application file for complete search history.

(56) References Cited

U.S. PATENT DOCUMENTS

| 5,461,372 A | 10/1995 | Busak et al. |
| 7,969,302 B2 | 6/2011 | Srinivasa et al. |
| 9,665,169 B1* | 5/2017 | Dai .................. G06F 3/011 |
| 2007/0270122 A1 | 11/2007 | Ewell, Jr. |
| 2008/0231462 A1 | 9/2008 | Hobart |
| 2009/0216910 A1 | 8/2009 | Duchesneau |
| 2014/0266669 A1 | 9/2014 | Fadell et al. |
| 2015/0309484 A1 | 10/2015 | Lyman |
| 2015/0309487 A1 | 10/2015 | Lyman |
| 2015/0347902 A1 | 12/2015 | Butler, Jr. et al. |
| 2016/0189527 A1 | 6/2016 | Peterson et al. |
| 2016/0203700 A1 | 7/2016 | Bruhn et al. |
| 2016/0234034 A1* | 8/2016 | Mahar .................. H04L 12/282 |
| 2017/0086731 A1* | 3/2017 | Raymann ............ A61B 5/4809 |

FOREIGN PATENT DOCUMENTS

| CN | 101847278 A | 9/2010 |
| CN | 105425707 A | 3/2016 |
| CN | 205091870 U | 3/2016 |

(Continued)

OTHER PUBLICATIONS

IBM: List of IBM Patents or Patent Applications Treated as Related (Appendix P), Feb. 23, 2018, 2 pages.

(Continued)

*Primary Examiner* — Hung T Nguyen
(74) *Attorney, Agent, or Firm* — Michael O'Keefe

(57) ABSTRACT

Embodiments of the present invention disclose a method, computer program product, and system for determining a security level for accessing a restrictive area. A member that is associated with a restrictive area is determined. A security level for accessing the restrictive area based on data that is collected from a monitoring device associated with the determined member is determined.

17 Claims, 9 Drawing Sheets

(56) References Cited

FOREIGN PATENT DOCUMENTS

WO  2017185457 A1  11/2017

OTHER PUBLICATIONS

Pending U.S. Appl. No. 15/903,406, filed Feb. 23, 2018, entitled: "Physical Condition Based Intelligent House Security System", 41 pages.
Mell et al., "The NIST Definition of Cloud Computing", Recommendations of the National Institute of Standards and Technology, Special Publication 800-145, Sep. 2011, 7 pages.

* cited by examiner

US 10,210,683 B1

PHYSICAL CONDITION BASED INTELLIGENT HOUSE SECURITY SYSTEM

BACKGROUND

The present invention relates generally to the field of security management, and more particularly to methods, systems and products for determining a security level for accessing a restrictive area.

The present disclosure generally relates to security management. Specifically, the present disclosure relates to methods, systems and products for determining a security level for accessing a restrictive area.

Security management is critical in almost every industry. For example, in a house or an apartment, the doors and windows may be protected by an antitheft system. For another example, the buildings or offices of an origination may adopt security devices (such as security doors and windows), access control systems, such as fingerprint identification, monitoring cameras, and the like. Accordingly, it may be advantageous to control the security for the certain area in an intelligent and safe way.

SUMMARY

Embodiments of the present invention disclose a method, computer program product, and system for determining a security level for accessing a restrictive area. A member that is associated with a restrictive area is determined. A security level for accessing the restrictive area based on data that is collected from a monitoring device associated with the determined member is determined.

DETAILED DESCRIPTION

Figure 1:
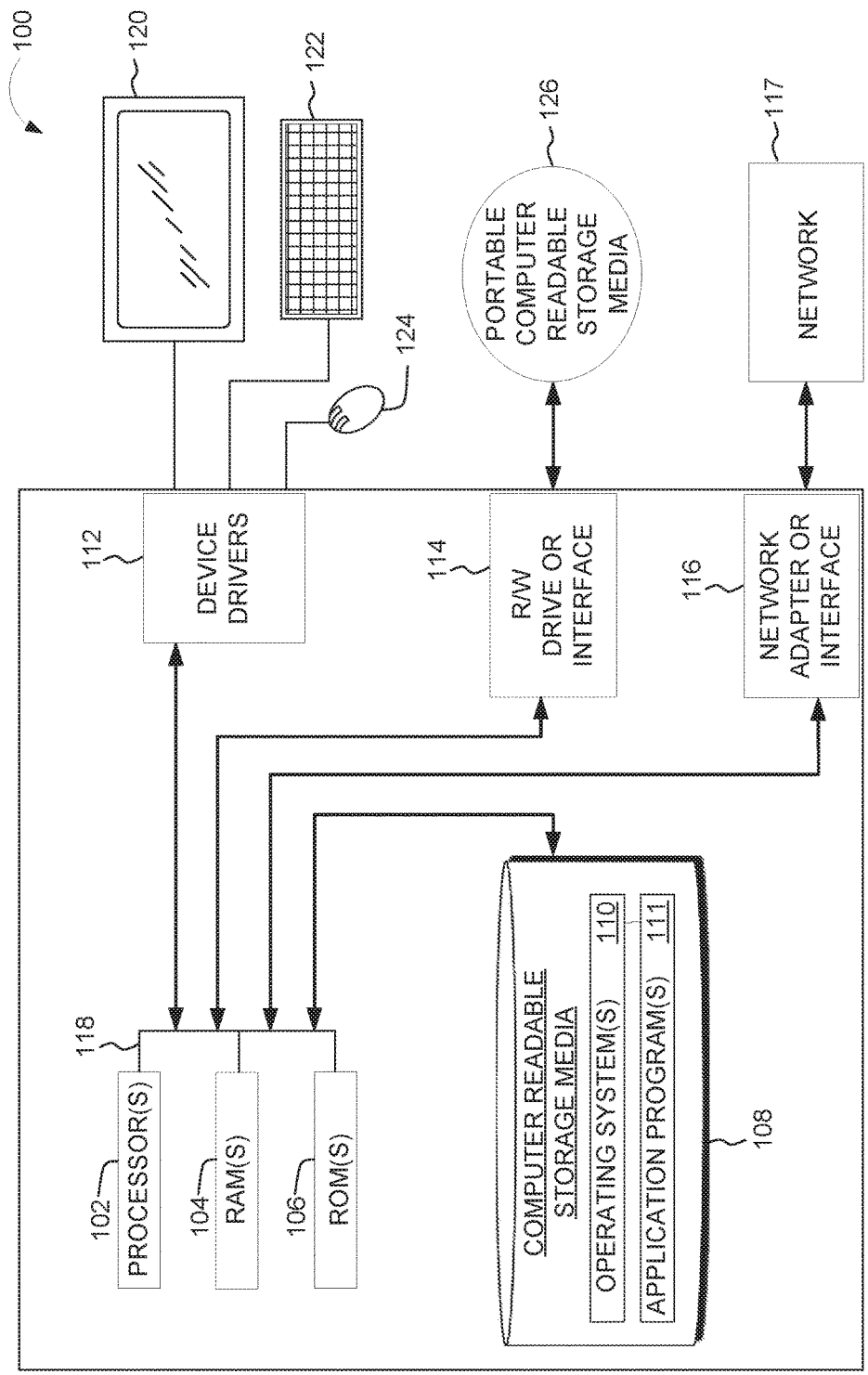
FIG. 1 depicts the components of an exemplary cloud computing node according to an embodiment of the present invention.

Embodiments of the present invention relate to the field of computing, and more particularly to security systems. The following described exemplary embodiments provide a system, method, and program product to, among other things, determine a security level for accessing a restrictive area. Therefore, the present embodiment has the capacity to improve the technical field of security management and security systems by utilizing a security device to track the movements of users of the security device and generate a security systems management level based on the user activity. It may be advantageous to dynamically determine a security level associated with a restrictive area based on at least one of user movements, a user profile, and Global Position System data.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a block diagram of components of cloud computing node 100, in accordance with an embodiment of the present invention. It should be appreciated that FIG. 1 provides only an illustration of one implementation and does not imply any limitations with regard to the environments in which different embodiments may be implemented. Many modifications to the depicted environment may be made.

Cloud computing node 100 may include one or more processors 102, one or more computer-readable RAMs 104, one or more computer-readable ROMs 106, one or more computer readable storage media 108, device drivers 112, read/write drive or interface 114, network adapter or interface 116, all interconnected over a communications fabric 118. Communications fabric 118 may be implemented with any architecture designed for passing data and/or control information between processors (such as microprocessors, communications and network processors, etc.), system memory, peripheral devices, and any other hardware components within a system.

One or more operating systems 110, and one or more application programs 111, are stored on one or more of the computer readable storage media 108 for execution by one or more of the processors 102 via one or more of the respective RAMs 104 (which typically include cache memory). In the illustrated embodiment, each of the computer readable storage media 108 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Cloud computing node 100 may also include a R/W drive or interface 114 to read from and write to one or more portable computer readable storage media 126. Application programs 111 on cloud computing node 100 may be stored on one or more of the portable computer readable storage media 126, read via the respective R/W drive or interface 114 and loaded into the respective computer readable storage media 108.

Cloud computing node 100 may also include a network adapter or interface 116, such as a TCP/IP adapter card or wireless communication adapter (such as a 4G wireless communication adapter using OFDMA technology) for connection to a network 117.

Application programs 111 on cloud computing node 100 may be downloaded to the computing device from an external computer or external storage device via a network (for example, the Internet, a local area network or other wide area network or wireless network) and network adapter or interface 116. From the network adapter or interface 116, the programs may be loaded onto computer readable storage media 108. The network may comprise copper wires, optical fibers, wireless transmission, routers, firewalls, switches, gateway computers and/or edge servers.

Cloud computing node 100 may also include a display screen 120, a keyboard or keypad 122, and a computer mouse or touchpad 124. Device drivers 112 interface to display screen 120 for imaging, to keyboard or keypad 122, to computer mouse or touchpad 124, and/or to display screen 120 for pressure sensing of alphanumeric character entry and user selections. The device drivers 112, R/W drive or interface 114 and network adapter or interface 116 may comprise hardware and software (stored on computer readable storage media 108 and/or ROM 106).

Figure 2:
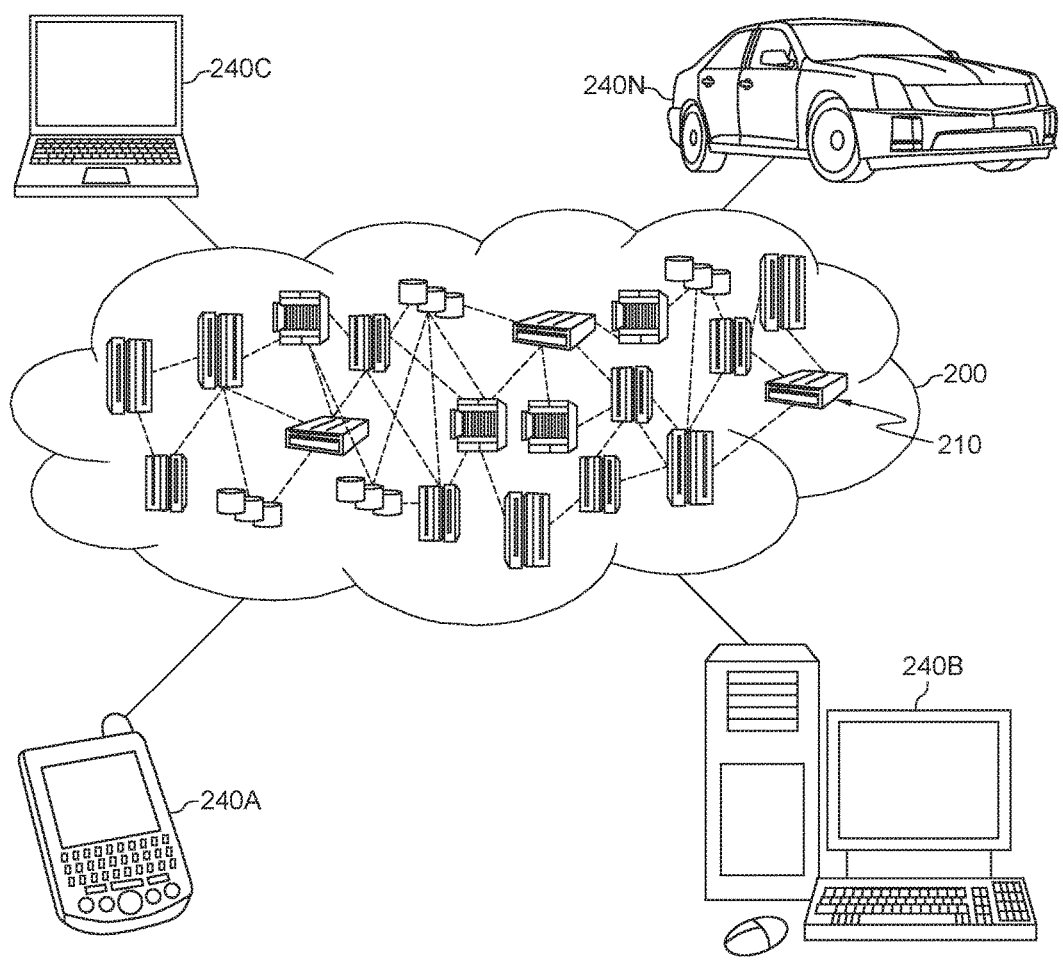
FIG. 2 depicts a cloud computing environment according to an embodiment of the present invention.

Referring now to FIG. 2, illustrative cloud computing environment 200 is depicted. As shown, cloud computing environment 200 includes one or more cloud computing nodes 210 with which local computing devices used by cloud consumers, such as, for example, personal digital assistant (PDA) or cellular telephone 240A, desktop computer 240B, laptop computer 240C, and/or automobile computer system 240N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 240A-N shown in FIG. 2 are intended to be illustrative only and that computing nodes 10 and cloud computing environment 200 can communicate with any type of computerized device over any type of network and/or network addressable connection (e.g., using a web browser).

Figure 3:
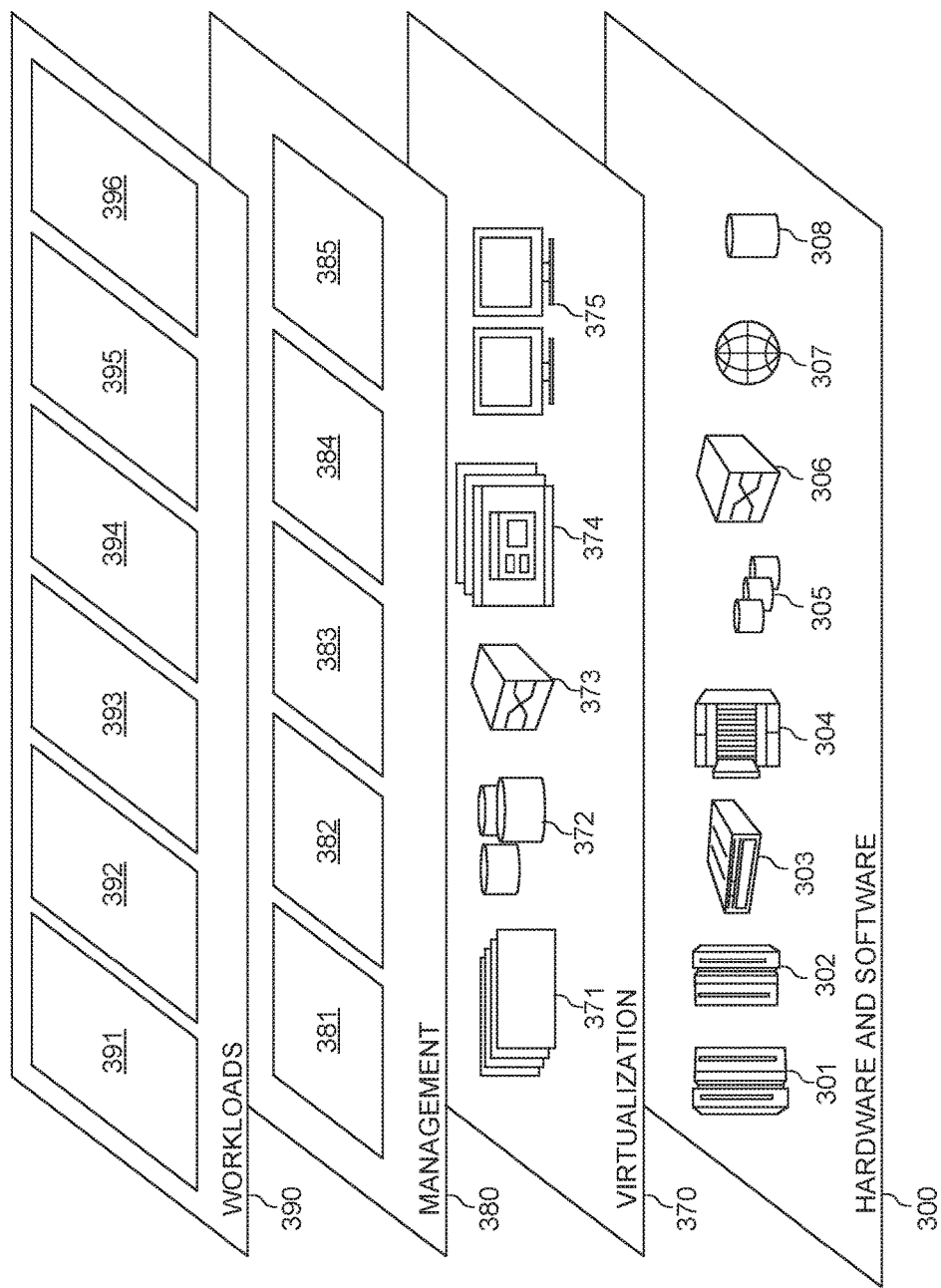
FIG. 3 depicts abstraction model layers according to an embodiment of the present invention.

Referring now to FIG. 3, a set of functional abstraction layers provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include: mainframes 301; RISC (Reduced Instruction Set Computer) architecture based servers 302; servers 303; blade servers 304; storage devices 305; and networks and networking components 306. In some embodiments, software components include network application server software 307 and database software 308.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and security processing 396. The security processing 396 may implement the solution for security management.

For the purpose of description, detailed description will be presented to various implementations of the present disclosure by using the security management for a house as an environment. In another environment, the restrictive area may be an office, a room, and the like. It is to be understood that antitheft doors and windows for protecting the house are just examples of the security devices for controlling an access to the restrictive area, and there may be other devices for managing the security issues for the restrictive area. For example, fingerprint identification devices may be deployed for opening a specific door.

Some approaches have been proposed to perform security management. In one approach, a monitoring system may be deployed within the restrictive area, where monitoring devices such as cameras may be distributed at important positions in the restrictive area. In response to an abnormal situation being detected by the monitoring devices, the security devices such as doors and windows may be locked manually or automatically to ensure the security in the restrictive area. However, this approach is heavily depended on physical devices such as cameras and needs a central control system. Besides the financial cost, installing cameras in the house and monitoring the house all the time may not be acceptable to the family members due to privacy reasons. In another approach, the doors and windows of the house may be locked all the time for security consideration. However, the excessive security arrangements may bring inconvenience to the family members.

In order to at least partially solve the above and other potential problems, a new method and system for security management are disclosed herein. Usually, if a waking family member is in the house, he/she may be on guard against an illegal invasion. At this point, the security level for protecting the house may be set to a relative low value (for example, the windows may be unlocked and only the front door may be locked). If the family member falls asleep, the security level may be set to a relative high value and all the doors and windows may be locked.

According to implementations of the present disclosure, data that is collected from a monitoring device associated with a family member may be utilized to decide a security level for protecting the house. In this implementation, the collected data may indicate a defense level of the family member. Here, the defense level refers to an extent to which the family member can protect house from the illegal invasion. In turns, a security level may be determined based on the defense level.

Based on the above, a computer-implemented method is disclosed hereinafter. In the method, a member that is associated with a restrictive area may be determined. A security level for accessing the restrictive area may be determined based on data that is collected from a monitoring device associated with the determined member. Here, the monitoring device may be carried by the determined member. Hereinafter, reference will be made to FIG. 4 to describe the detailed implementation.

Figure 4:
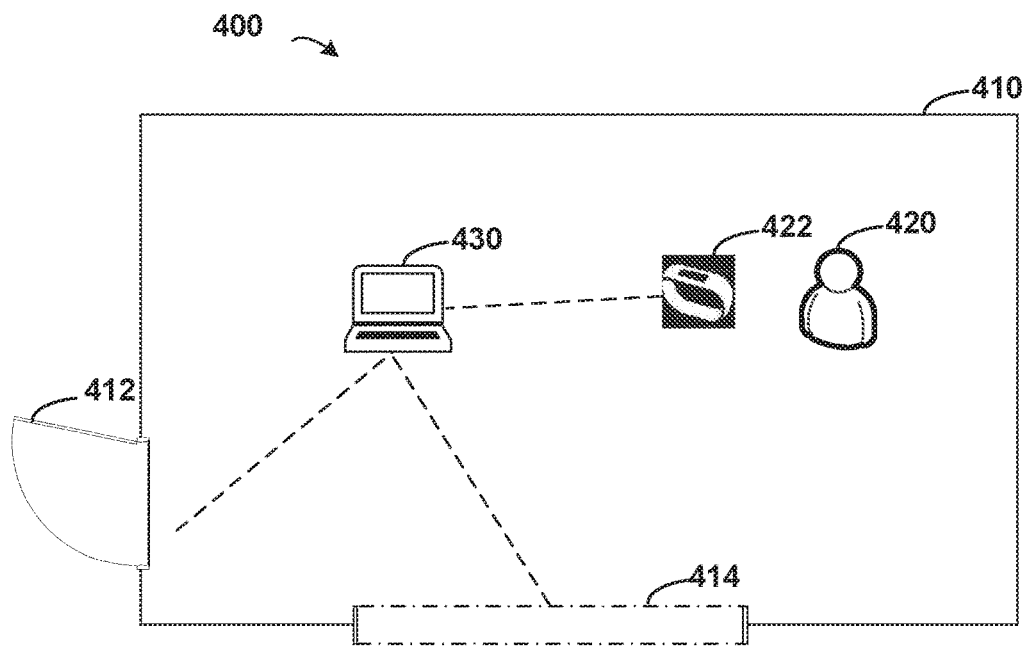
FIG. 4 depicts a diagram for security management in a restrictive area according to one implementation of the present disclosure.

FIG. 4 depicts a diagram 400 for security management in a restrictive area according to one implementation of the present disclosure. The restrictive area in the context of the disclosure may be a house, a room, or a building and the like. As depicted in FIG. 4, a house 410 is illustrated as an example restrictive area, and there may be several security devices such as a door 412 and a window 414 of the house 410. In this implementation, the monitoring device 422 that is associated with the member 420 may collect data. Thereby, the security level for accessing the house 410 may be determined based on data collected by the monitoring device 422 that is associated with the member 420.

Although the above FIG. 4 illustrates the monitoring device 422 as a wristband, the monitoring device 422 may be implemented by other types of fitness trackers as long as the monitoring device 422 may track the activity and/or physical data of the member 420. In one implementation, the monitoring device 422 may be a wearable device. Further, with developments of the terminal device, more and more mobile phones and/or other terminal devices are equipped with fitness monitoring modules. In this regard, these terminal devices may also be considered as the monitoring device 422. In another implementation, the monitoring device 422 may be a camera or a vibration sensor (for example, equipped in the room) for tracking the activity and/or physical data of the member 420.

Usually, if the monitoring device 422 shows the member 420 makes a lot of activities in the house 410 (for example, running on a running machine), it may possibly indicate the member 420 may be awake and thus the security level may be set to a low value (for example, the door 412 may be locked and the window 414 may be open). If the monitoring device 422 shows the member 420 sedentary in the house 410, it may indicate that the member 420 may possibly be old or fall asleep, and thus the security level may be set to a high value (for example, both of the door 412 and the window 414 may be locked). Details of the implementation will be described below with reference to FIG. 5.

Figure 5:
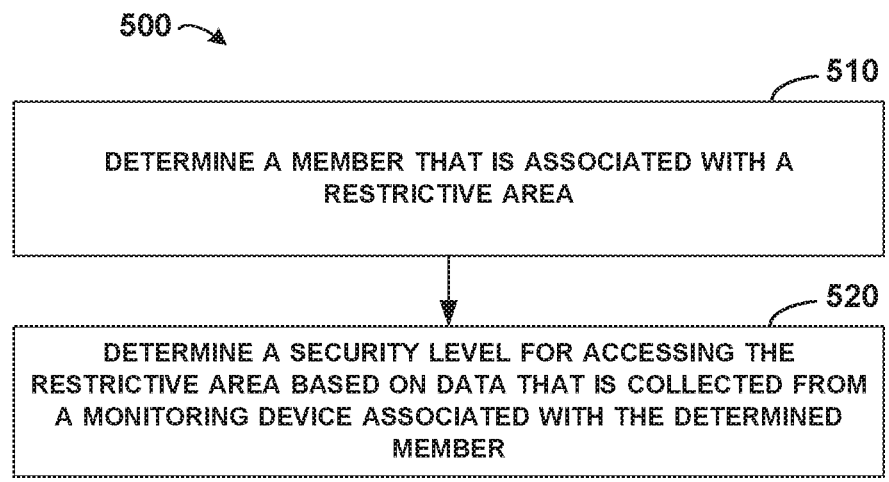
FIG. 5 depicts a flowchart of a method for determining a security level associated with a restrictive area according to one implementation of the present disclosure.

FIG. 5 depicts a flowchart of a method 500 for determining a security level associated with a restrictive area according to one implementation of the present disclosure. In the implementation, a member that is associated with a restrictive area may be determined (block 510). Continuing the example of FIG. 4, the member 420 associated with the house 410 may be one of the family members of the house 410. In this example, the family members may be registered in a table for recording the association relationship between the family members and their monitoring devices. Table 1 is an example data structure for recording the association relationship.

TABLE 1

Example Data Structure

| Name | Monitoring Device ID | Mobile Phone ID |
|---|---|---|
| Alice | R9RNLPC | Alice-phone |
| Bob | A2D9M80 | Bob-phone |
| Charlie | F6N2KP3 | Charlie-phone |

In the above table, the first column "Name" shows the name of the family member, the second column "Monitoring Device ID" shows the identification of the monitoring device of the family member, and the third column "Mobile Phone ID" shows the identification of the mobile phone of the family member, where the respective mobile phone may be connected to the respective monitoring device.

In the implementation of the present disclosure, the monitoring device 422 may connect, via a respective phone, to a server 430 for implementing the method. For example, Alice may have a monitoring device named "R9RNLPC" and a mobile phone named "Alice-phone." At this point, the data collected by the monitoring device "R9RNLPC" may be transmitted to the server 430 via the mobile phone "Alice-phone." It is to be understood that the above Table 1 is only one example for recording the association relationship. In another example, the associated relationship may be stored in another data structure.

In one implementation, the monitoring device 422 may directly connect to a server 430 for implementing the method. In another implementation, if Alice's mobile phone is equipped with a fitness monitoring module, then the mobile phone "Alice-phone" may be directly considered as the monitoring device 422 and the data collected by the mobile phone "Alice-phone" may be directly transmitted to the server.

In one implementation of the present disclosure, connection states of the monitoring devices in the above Table 1 may be utilized for determining the member that is associated with the house 410. If it is determined that the monitoring device is connecting to the server, it shows that the owner of the monitoring device is in/near the house 410 and then the data collected by the monitoring device may be used for determining the security level.

In one implementation of the present disclosure, locations of the monitoring devices in the above Table 1 may be utilized for determining the member that is associated with the house 410. If it is determined from Global Position System (GPS) information that the monitoring device is in/near the house 410, the data collected by the monitoring device may be used for determining the security level.

Once the member 420 associated with the house 410 is determined based on the above Table 1, data may be collected from the monitoring device 422 associated with the determined member 420. Further, a security level for accessing the restrictive area may be determined based on the collected data (block 520).

In one implementation of the present disclosure, a defense level of the member 420 may be determined based on data that is collected from a monitoring device 422 associated with the determined member 420. In the implementation, the data may include various types such as the activity ability and/or the physical condition of the member 420. Here, the defense level may be set according to any of the activity ability or the physical condition of the member 420. In one example, the stronger the activity ability is, the higher the defense level is. Similarly, the better the physical condition is, the higher the defense level is.

Further, the security level for accessing the restrictive area may be determined based on the obtained defense level. In the context of the present disclosure, the security level may define the difficulty degree for accessing the restrictive area. In the example of the house 410, if both of the door 412 and the window 414 are locked, then the security level of the house 410 is high. If neither of the door 412 and the window 414 is locked, then the security level of the house 410 is low.

Figure 6:
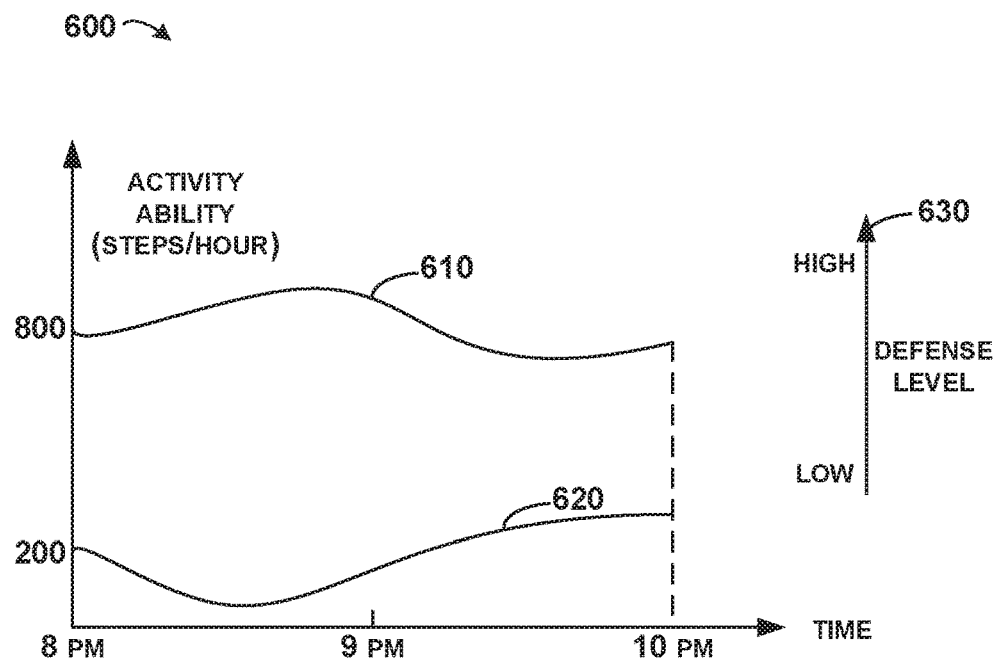
FIG. 6 depicts an exemplary graph including activity abilities that are determined from the data collected from monitoring devices according to one implementation of the present disclosure.
Figure 7:
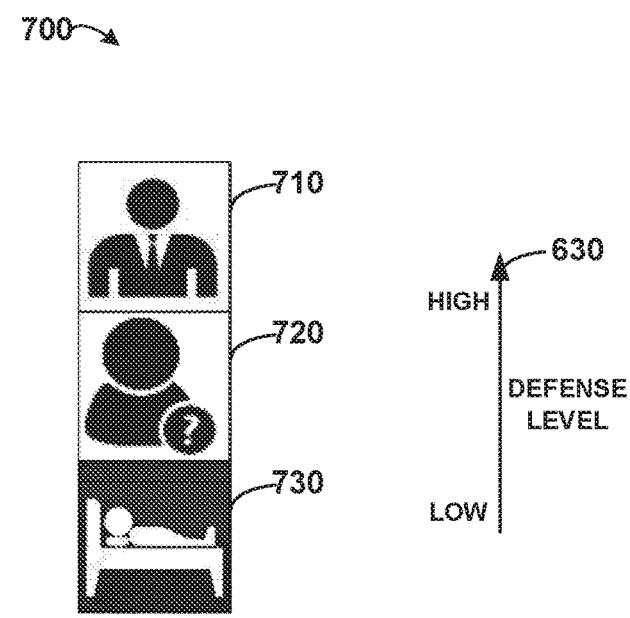
FIG. 7 depicts an exemplary graph including physical conditions that are determined based on a connection with monitoring devices according to one implementation of the present disclosure.

As described in the preceding paragraphs, the defense level indicates the extent to which the family member can protect house from the illegal invasion, thereby the security level may be set in an inverse proportion to the defense level. It is to be understood that the above paragraphs provide example definitions of the defense level and the security level for the purpose of illustration instead of limitation. In another implementation, similar indicators may be defined in another manner. As described in the preceding paragraphs, various types of data may be collected from the monitoring device 422. Reference will be made to FIG. 6 and FIG. 7 to illustrate details of determining the defense level according to the activity ability and physical condition of the member 420, respectively.

In one implementation of the present disclosure, the activity ability of the member 420 may be obtained from the collected data. Here, the activity ability may indicate a measurement of activities performed by the member 420 during a predefined time period. Then, the defense level may be determined based on the obtained activity ability.

FIG. 6 depicts an example graph 600 including activity abilities that are determined from the data collected from monitoring devices according to one implementation of the present disclosure. In FIG. 6, the horizontal axis indicates the time during a day, and the vertical axis indicates the activity ability of the members. According to the vertical axis, the activity ability is represented by a measurement of activities performed by the member during a predefined time period. FIG. 6 illustrates two curves of the activity abilities of the members during 8 PM-10 PM in the evening.

In one implementation of the present disclosure, the activity ability may be obtained based on a motion measurement from a motion sensor in the monitoring device. Usually, the motion sensor equipped in the monitoring device 422 may track the movement of the member 420. For example, the monitoring device 422 may count how many steps the member 420 walks during a predefined time period. At this point, the activity ability may be indicated by a walking speed of the member 420. The curve 610 shows an activity ability with a relative high values, and the curve 620 shows an activity ability with a relative low values. Continuing the above example of the house 410, if Alice is walking and Bob is watching TV in the house 410, the curve 610 may correspond to Alice's activity ability and the curve 620 may correspond to Bob's activity ability.

In the example of FIG. 6, the defense level of Alice may be set to a relative high value, while the defense level of Bob may be set to a relative low value. In one example, the defense level may be quantized to values with a range between a minimum and a maximum values (for example, from 1 to 3). In an example, the activity ability may be determined based on Table 2.

TABLE 2

Quantization of Activity Ability

| No. | Activity Ability (Speed: steps/hour) | Quantized Value |
|---|---|---|
| 1 | Speed >= 1000 | 3 |
| 2 | 400 < Speed < 1000 | 2 |
| 3 | Speed <= 400 | 1 |

Although FIG. 6 illustrates the activity ability by taking the walking speed of the member as an example, FIG. 6 is only for illustration without a limitation purpose. In another implementation, the activity ability may be determined from the calories consumed by the member 420, the final amount of walking steps by the member 420, and the like. In one implementation of the present disclosure, the value of the activity ability may be directly used as the defense level, and the security level may be decreased with the increase of the defense level.

Sometimes, the activity ability determined from the measurement of activities during a time period may not correctly reflect the member's common activity ability. At this point, the determined activity ability may be updated with a historical activity ability that is determined based on a measurement of activities performed by the member during a previous time period.

In one example, it is supposed that the average walking speed of the member 420 is 1000 steps/hour during 8 PM to 10 PM, and the walking speed of the member 420 is 800 steps/hour for a given evening, then the activity ability for the given evening is lower than the average activity ability. At this point, the activity ability for the given evening may be updated to, for example, 800/1000=80% of the average activity ability. In another example, if the walking speed is higher for the given evening, the activity ability may be updated to a value higher than the average activity ability.

FIG. 7 depicts an example graph 700 including physical conditions that are determined based on a connection with monitoring devices according to one implementation of the present disclosure. In one implementation, the physical conditions may include various modes: a "waking" mode indicating the member is waking, an "unknown" mode indicating that the physical condition of the member 420 cannot be determined; and a "sleeping" mode 730 indicating the member 420 is sleeping. It is known that the defense level of a waking member may be higher than that of a sleeping member, at this point, the defense level may be determined according to the direction of the arrow 630 in FIG. 7.

In one implementation of the present disclosure, the physical condition may be read from the monitoring device 422 when the monitoring device 422 is connected to the server 430. Various indicators may be bases for determining the physical condition, for example, the pulse/heart beats of the member 420 may be used to determine the physical condition. In one example, if the pulse/heart beats is lower than 60, it may be determined that the member 420 is in a sleeping mode; if the pulse/heart beats is higher than 70, it may be determined that the member 420 is in a waking mode; else, if the pulse/heart beats is between 60 to 70, the member 420 may be in an unknown mode.

In another implementation, the member 420 may directly set the physical condition in the monitoring device 422. When the member 420 is going to bed, then he/she may switch the physical condition from the "waking" mode to the "sleeping" mode. Further, if the member 420 wakes up, then he/she may switch the physical condition from the "sleeping" mode to the "walking" mode.

Although the above paragraph illustrates the determination of the physical condition by taking the pulse/heart beats as an example, the physical condition may be determined from other data collected from the monitoring device 422. For example, the breath rates, the blood pressure and other physical measurements may be used to determine the physical condition of the member 420. For another example, the gender, and the age of the member 420 may also be considered in determining the physical condition.

In one implementation of the present disclosure, the physical condition may be quantized to values with a range between a minimum and a maximum values (for example, from 1 to 3). In an example, the physical condition may be determined based on Table 3.

TABLE 3

Quantization of Physical Condition

| No. | Physical Condition | Value |
|---|---|---|
| 1 | Waking Mode | 3 |
| 2 | Unknown Mode | 2 |
| 3 | Sleeping Mode | 1 |

In one implementation of the present disclosure, the physical condition may be directly used as the defense level, and the security level may be decreased with the increase of the defense level. In another implementation of the present disclosure, the defense level may be determined based on a combination of the activity ability and the physical condition. For example, the defense level may be determined based on an average of the values of the activity ability and the physical condition. Alternatively, the defense level may be determined based on another formula involving the values of the activity ability and the physical condition. Specifically, a product of the values of the activity ability and the physical condition for a given member "i" may be considered as the defense level based on the following Formula 1.

$$\text{DefenseLevel}(i) = \text{ActivityAbility}(i) * \text{PhysicalCondition}(i) \quad \text{Formula 1}$$

In the Formula 1, DefenseLevel(i) represents the defense level, ActivityAbility(i) represent the activity ability, and PhysicalCondition(i) represent the physical condition for the given member "i," respectively.

In one implementation of the present disclosure, the data collected from the monitoring device 422 may be filtered to remove the noise. In one example, the member 420 is sleeping and the movement of the arm in the dream switches the monitoring device 422 from the "sleeping" mode to the "waking" mode, then the transient "waking" mode may be filtered out because the movement is just noise data while the member 420 is sleeping.

In one implementation of the present disclosure, a daily behavior of the member 420 may be considered in determining the security level. Here, the daily behavior may refer to the daily living habit of the member 420, and the daily behaviors of the family members may be stored at the server 430 in advance, and the daily behaviors may be used to update the security levels. In one example, the daily behavior of Alice may be defined as below in Table 4:

TABLE 4

Daily Behavior

| No. | Behavior | Time Period |
|---|---|---|
| 1 | Sleeping | 08:00-18:00 |
| 2 | Working | 22:00-07:00 (Next day) |

According to Table 4, Alice usually sleeps during day time from 08:00-18:00 and works in the night from 22:00 to 07:00 in the next morning. At this point, it may be determined that Alice is a night person. Accordingly, the security level may be updated according to Alice's daily behavior. In one example, the security level for the night may be decreased slightly because Table 4 shows that usually Alice work during the night. In another example, the security level for the day time may be increased slightly because usually Alice sleeps at the day time.

In one implementation of the present disclosure, a combination of the data collected from more than one member may be utilized for determining the security level. Specifically, defense levels of more than one member associated with the restrictive area may be determined, and a combination of the defense levels may be used to determine the final security level. With respect to the family members Alice, Bob, and Charlie, besides the defense level of Alice, other defense levels of Bob and Charlie may be determined. Further, the final security level may be determined based on a combination of the obtained defense levels of Alice, Bob and Charlie. In another implementation, the final security level may be determined based on data associated with more or less members.

In one implementation of the present disclosure, the defense level of all the members may be added up to determine the final defense level. Based on Formula 1, the final defense level may be determined as below according to Formula 2. In the Formula 2, FinalDefenseLevel(n) represents a final defense level for n numbers in the family (in the above example of the three family members Alice, Bob, and Charlie, n=3).

$$\text{FinalDefenseLevel}(n) = \sum_{i=1}^{n} \text{ActivityAbility}(i) * \text{PhysicalCondition}(i) \quad \text{Formula 2}$$

In one implementation of the present disclosure, the determined defense level may be compared with a defense level for a desired situation, so as to determine a normalized defense level. For example, in a desired situation, all the members may be in the best physical condition (the "waking" mode). As this point, the normalized defense level may be determined according to Formula 3 as below:

$$\text{NorDefenseLevel1}(n) = \frac{\sum_{i=1}^{n} \text{ActivityAbility}(i) * \text{PhysicalCondition}(i)}{\sum_{i=1}^{n} \text{ActivityAbility}(i) * \text{PhysicalCondition}_{max}} \quad \text{Formula 3}$$

In the Formula 3, PhysicalConditionmax represents a best physical condition. In the above example values of the physical condition, PhysicalConditionmax=3.

In another example, in a desired situation, all the members may be in the best physical condition (the "waking" mode), and all the members may have the strongest activity ability (the speed >=1000). As this point, the alternative normalized defense level may be determined according to Formula 4 as below:

$$\text{NorDefenseLevel2}(n) = \frac{\sum_{i=1}^{n} \text{ActivityAbility}(i) * \text{PhysicalCondition}(i)}{\sum_{i=1}^{n} \text{ActivityAbility}_{max} * \text{PhysicalCondition}_{max}} \quad \text{Formula 4}$$

In the Formula 4, ActivityAbility_max represents the strongest activity ability, and PhysicalCondition_max represents a best physical condition. Specifically, continuing the above example, the strongest activity ability and the best physical condition may be set to: ActivityAbility_max=3 and PhysicalCondition_max=3. It is to be understood that the Formulas provided in the present disclosure are just examples for illustration without a limitation purpose.

Once the security level is determined, the access to the restrictive area may be controlled based on the security level. A security rule may be predefined based on the security levels. In one implementation, each security level may correspond to one or more predefined states (locked/unlocked) of one or more security devices such as the door 412 and window 414 of the house 410.

Figure 8:
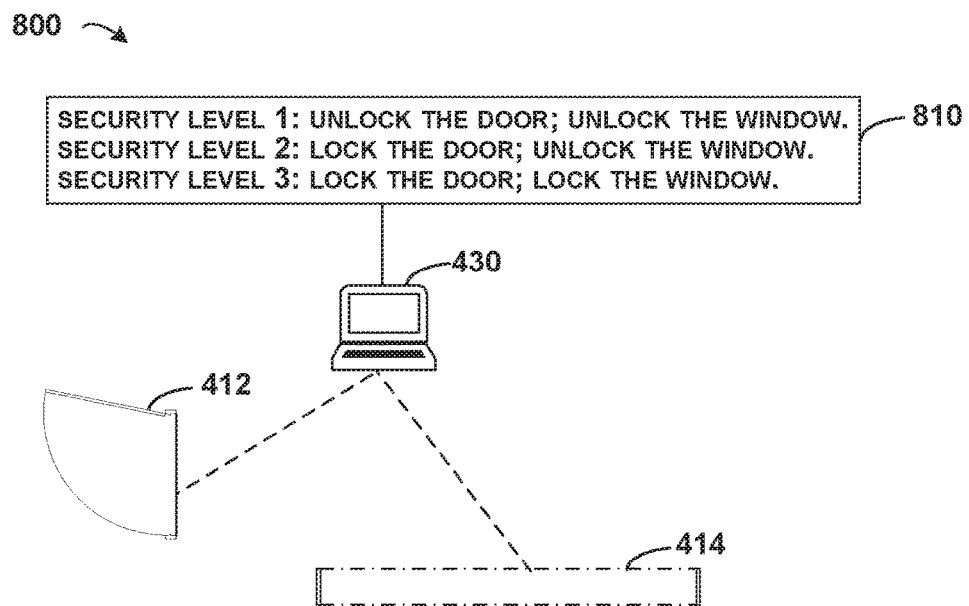
FIG. 8 depicts a diagram for managing security devices for protecting a restrictive area based on the security levels according to one implementation of the present disclosure.

Details will be provided by referring to FIG. 8, which depicts a diagram 800 for managing security devices for protecting a restrictive area based on the security levels according to one implementation of the present disclosure. In a block 810 of FIG. 8, the security levels 1 to 3 may be defined in advance. The security level 1 may be a relative low level and may define that both of the door 412 and the window 414 may be unlocked. The security level 2 may be a medium level and may define that the door 412 may be locked and the window 414 may be unlocked. The security level 3 may be a relative high level and may define that both of the door 412 and the window 414 may be locked.

In one implementation of the present disclosure, the state of the security device associated with the restrictive area is determined based on the security level. Continuing the above example, if the security level is level 3, then the door 412 and the window 414 should be locked according to the security rule. It is to be understood that in the above implementation, the definitions of the security levels and security rules are just examples for illustration purposes instead of limitations. In another implementation, the security levels and the security rules may be defined according to the specific requirements for controlling the restrictive area.

Figure 9:
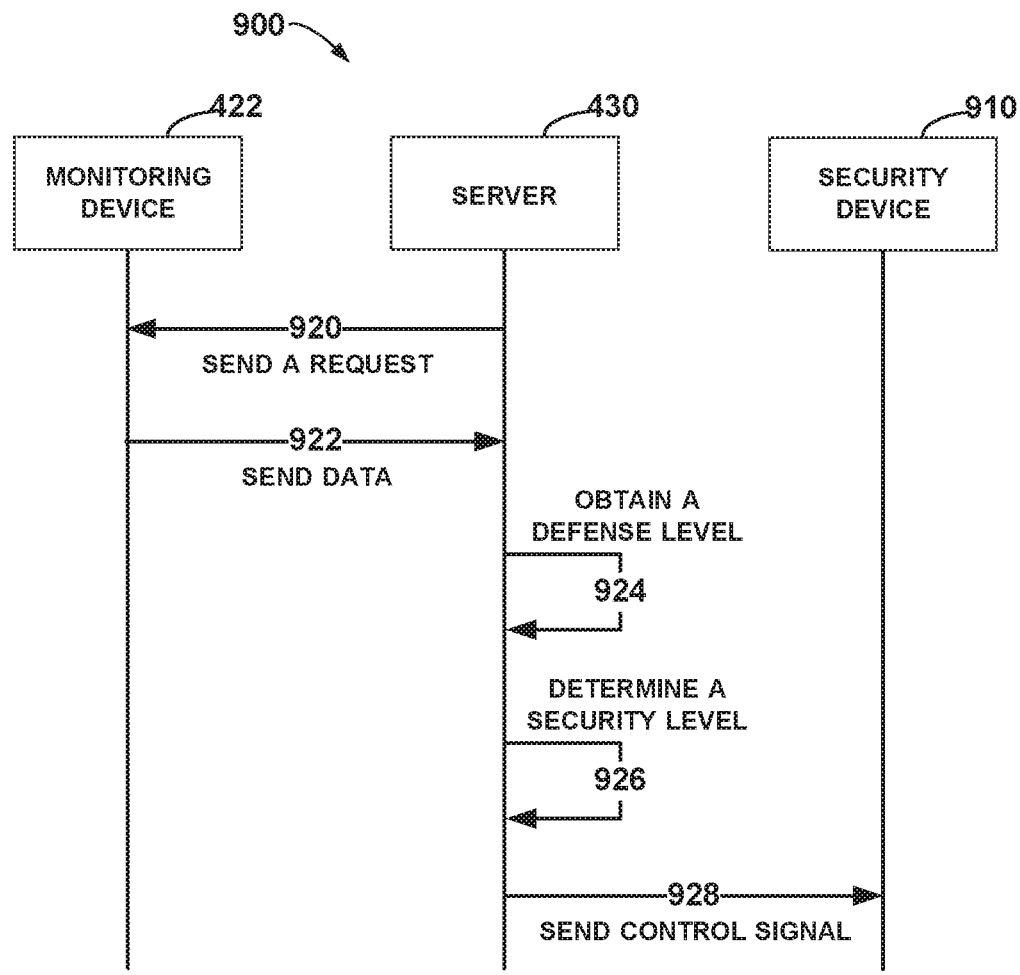
FIG. 9 depicts a swim lane diagram for illustrating interactions between various devices according to one implementation of the present disclosure.

FIG. 9 depicts a diagram 900 for illustrating interactions between various devices according to one implementation of the present disclosure. As depicted in FIG. 9, the server 430 may send 920 to the monitoring device 422 a request for querying the data that is collected by the monitoring device 422. In response to receiving the request, the monitoring device 422 may send 922 the collected data to the server 430. The server 430 may obtain 924 a defense level based on the procedure as described in the preceding paragraphs. Based on the obtained defense level, the server 430 may determine 926 a security level, and then send 928 a control signal to the security device 910.

Figure 10:
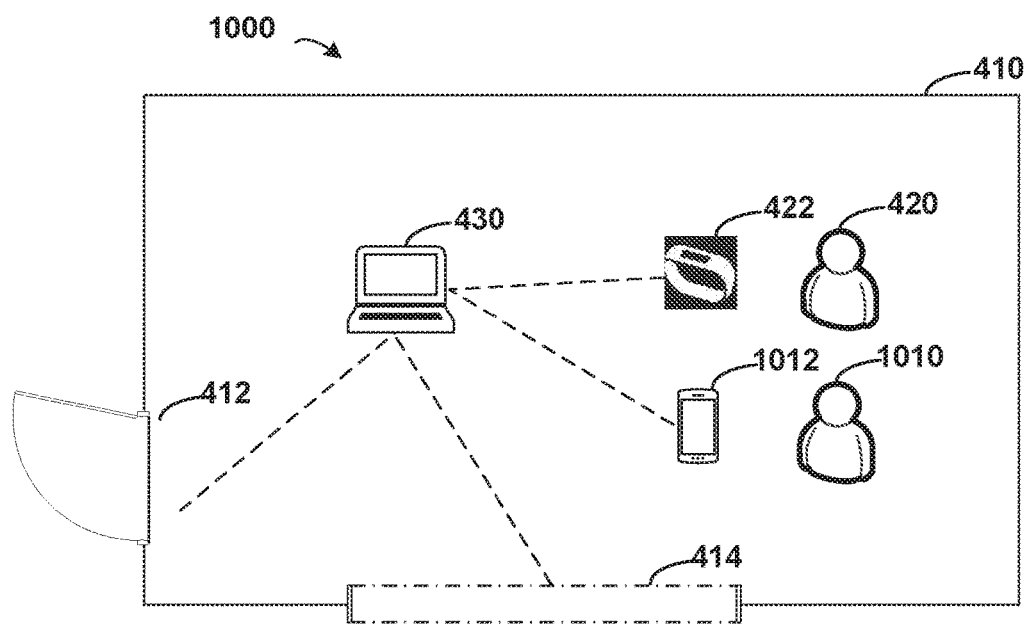
FIG. 10 depicts a diagram for security management in a restrictive area based on a security level according to one implementation of the present disclosure, where the security level is determined based on data that is collected from respective monitoring devices associated with respective members associated with the restrictive.

It is to be understood that the procedure in FIG. 9 is just an example for determining the security level and controlling the security device based on the determined security level. In another implementation, the procedure may be implemented in a modified manner. For example, the monitoring device 422 may periodically send the collected data to the server 430 without a need for the server 430 to send a request. In another example, the monitoring device 422 may determine the defense level by itself and then send the determined defense level to the server 430. In still another example, there may be a plurality of monitoring devices 422 and a plurality of security devices 910, and the server 430 may obtain the defense level based on data that is collected from the plurality of monitoring devices 422 and control the plurality of security devices 910 based on the obtained defense level. Reference will be made to FIG. 10, which depicts a diagram for security management in a restrictive area based on a security level according to one implementation of the present disclosure.

As depicted in FIG. 10, the two monitoring devices 422 and 1012 are respectively owned by the family members 420 and 1010 of the house 410, where the monitoring device 422 may be a wristband and the monitoring device 1012 may be a mobile phone. The server 430 may determine the defense levels based on the data collected by the monitoring devices 422 and 1012, respectively. Then the server 430 may determine the final security level and control the house 410 based on the determined final security level.

With the implementations of the present disclosure, the data collected by the monitoring device of the member associated with the restrictive area may be used to determine the defense level of the member. As the determined defense level may reflect the ability of the member to protect the restrictive area, a corresponding security level may be determined based on the defense level. Further, the security devices such as doors and windows may be set to locked/unlocked states according to the security level.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for determining a security level for accessing a restrictive area executed by a computer processor, the method comprises:
   determining a member that is associated with a restrictive area;
   determining a security level for accessing the restrictive area based on data that is collected from a monitoring device associated with the determined member;
   determining a further member that is associated with the restrictive area; and
   determining the security level for accessing the restrictive area based on a combination of data that is collected from the monitoring device associated with the determined member and data that is collected from a further monitoring device associated with the further member.

2. The method of claim 1, wherein determining the security level further comprises:
   determining a defense level of the member based on the collected data; and
   determining a security level for accessing the restrictive area based on the defense level.

3. The method of claim 2, wherein obtaining the defense level further comprises one or more of:
   obtaining an activity ability from the collected data as the defense level, the activity ability indicating a measurement of activities performed by the member during a predefined time period; and
   obtaining a physical condition from the collected data as the defense level, the physical condition indicting a measurement of physical condition of the member during a predefined time period.

4. The method of claim 3, further comprises:
updating the obtained activity ability with a historical activity ability that is obtained based on a measurement of activities performed by the member during a previous time period.

5. The method of claim 1, further comprises:
updating the security level based on a daily behavior of the member.

6. The method of claim 1, further comprises:
controlling an access to the restrictive area based on the security level.

7. A computer system for determining a security level for accessing a restrictive area, the computer system comprises:
one or more computer processors;
one or more computer-readable storage media;
program instructions stored on the computer-readable storage media for execution by at least one of the one or more processors, the program instructions comprising:
instructions to determine a member that is associated with a restrictive area;
instructions to determine a security level for accessing the restrictive area based on data that is collected from a monitoring device associated with the determined member;
instructions to determine a further member that is associated with the restrictive area; and
instructions to determine the security level for accessing the restrictive area based on a combination of data that is collected from the monitoring device associated with the determined member and data that is collected from a further monitoring device associated with the further member.

8. The computer system of claim 7, wherein instructions to determine the security level further comprises:
instructions to determine a defense level of the member based on the collected data; and
instructions to determine a security level for accessing the restrictive area based on the defense level.

9. The computer system of claim 8, wherein instructions to obtain a defense level further comprises one or more of:
instructions to obtain an activity ability from the collected data as the defense level, the activity ability indicating a measurement of activities performed by the member during a predefined time period; and
instructions to obtain a physical condition from the collected data as the defense level, the physical condition indicting a measurement of physical condition of the member during a predefined time period.

10. The computer system of claim 9, further comprises:
instructions to update the obtained activity ability with a historical activity ability that is obtained based on a measurement of activities performed by the member during a previous time period.

11. The computer system of claim 8, further comprises:
instructions to update the security level based on a daily behavior of the member.

12. The computer system of claim 8, further comprises:
instructions to control an access to the restrictive area based on the security level.

13. A non-transitory computer program product for determining a security level for accessing a restrictive area, the non-transitory computer program product comprises:
one or more computer-readable storage media and program instructions stored on the one or more computer-readable storage media, the program instructions comprising:
instructions to determine a member that is associated with a restrictive area;
instructions to determine a security level for accessing the restrictive area based on data that is collected from a monitoring device associated with the determined member;
instructions to determine a further member that is associated with the restrictive area; and
instructions to determine the security level for accessing the restrictive area based on a combination of data that is collected from the monitoring device associated with the determined member and data that is collected from a further monitoring device associated with the further member.

14. The non-transitory computer program product of claim 13, further comprises:
instructions to determine a defense level of the member based on the collected data; and
instructions to determine a security level for accessing the restrictive area based on the defense level.

15. The non-transitory computer program product of claim 14, further comprises one or more of:
instructions to obtain an activity ability from the collected data as the defense level, the activity ability indicating a measurement of activities performed by the member during a predefined time period; and
instructions to obtain a physical condition from the collected data as the defense level, the physical condition indicting a measurement of physical condition of the member during a predefined time period.

16. The non-transitory computer program product of claim 15, further comprises:
instructions to update the obtained activity ability with a historical activity ability that is obtained based on a measurement of activities performed by the member during a previous time period.

17. The non-transitory computer program product of claim 13, further comprises:
instructions to update the security level based on a daily behavior of the member.

* * * * *